US005440815A

United States Patent [19]

Inkster

[11] Patent Number: 5,440,815

[45] Date of Patent: Aug. 15, 1995

[54] GUIDE FOR ROTARY CUTTER TOOLS

[76] Inventor: Kevin R. Inkster, 107 Darlington Road, Darlington, Western Australia 6070, Australia

[21] Appl. No.: 46,090

[22] Filed: Apr. 12, 1993

[30] Foreign Application Priority Data

Apr. 13, 1992 [AU] Australia .............................. PL1847

[51] Int. Cl.[6] ....................... B23D 45/16; B23D 47/00; B24B 55/04

[52] U.S. Cl. ....................................... 30/390; 451/451

[58] Field of Search ........................ 30/390, 391, 380, ; 51/268, ; 83/397, 478, 860; 451/451

[56] References Cited

U.S. PATENT DOCUMENTS

| | | | |
|---|---|---|---|
| 1,623,290 | 4/1927 | Wappat | 30/390 |
| 2,589,309 | 3/1952 | Tompkins | 51/268 |
| 3,019,751 | 2/1962 | Fichera | 51/268 |
| 3,068,620 | 12/1962 | Tocci-Guilbert | 51/268 |
| 4,440,045 | 4/1984 | Aksamit | 51/268 |

FOREIGN PATENT DOCUMENTS

| | | | |
|---|---|---|---|
| 940226 | 10/1963 | United Kingdom | 51/268 |

*Primary Examiner*—Bruce M. Kisliuk
*Assistant Examiner*—Derris H. Banks
*Attorney, Agent, or Firm*—Dorsey & Whitney

[57] ABSTRACT

A guide for a hand-held tool having a housing to support a rotary cutter with a peripheral cutting formation and a motor to rotate the cutter. The guide having a rigid guide member with a peripheral wall to be disposed about the periphery of the rotary cutter, and a bracket to mount the guide to the housing. The peripheral wall having a slot therein through which portion of the rotary cutter projects to engage a workpiece, the degree of projection of the cutter being variable by relative pivotal movement between the bracket and the guide member. The bracket being configured to support the housing at a location spaced laterally from the guide member to provide additional stability to the guide member during operation.

14 Claims, 2 Drawing Sheets

GUIDE FOR ROTARY CUTTER TOOLS

This invention relates to a guide for a rotary cutter tool, particularly of the hand-held type, the guide being for the purpose of assisting the operator to control the cutting action to thereby improve the quality of the finished product and reduce the risk of injury to the operator.

The use of power tools both in the professional and hobby areas is a growth area notwithstanding the acknowledged high risk of injury from such tools, both when used by tradesmen and more so when used in the hobby environment. The need for greater safety has resulted in the application of guards of various forms being fitted to the cutting element of the power tool. The problem with such guards is that they frequently restrict the use of the tool to its fullest extent and as a result, the user of the tool frequently removes the guard when performing specific operations with the power tool.

The risk of injury when operating a power tool is principally associated with the depth of cut being too great causing the operator to lose control of the tool. Thus, if the cut depth can be controlled, the risk of injury is substantially reduced.

It is the object of the present invention to provide a depth control guide for a hand held power tool of an improved construction which is simple to operate and provides greater application in control of the cutting performed by the tool while also reducing the risk of injury to the operator.

With this object in view, there is provided according to the present invention a guide for a hand held power tool having a housing and a spindle rotatably supported in said housing and projecting therefrom to have mounted thereon a rotary cutter having a peripheral cutting formation, said guide comprising a rigid member having a peripheral wall to in use be disposed about at least portion of the periphery of the rotary cutter, means to mount said guide member on the power tool housing with said peripheral wall located about at least part of the periphery of said rotary cutter, a slot in said peripheral wall through which portion of said rotary cutter can project to engage a work piece, said mounting means being adapted to permit movement of said guide member relative to the cutter to adjust the extent of projection of the cutter through said slot, said peripheral wall on opposite sides of said slot being flat over portion of the length of said slot.

Conveniently, the peripheral wall is of an arcuate shape over portion of the length thereof, preferably non-concentric with the axis of the rotary cutter. The flat portion of the peripheral wall is preferably tangential to the arcuate portion of the wall.

In the preferred embodiment, the rigid member is pivotally connected to the mounting member about an axis parallel to the axis of the cutter and that pivot axis is located adjacent the end of the flat portion of the peripheral wall furthermost from the tangential junction. The arcuate shaped portion of the peripheral wall is conveniently of a progressively increasing radius with respect to the cutter axis from the junction with the flat portion of the wall.

Conveniently, a further support surface is provided on the guide at a location spaced laterally from the peripheral wall to provide lateral stability to the guide when performing a straight cut.

When the guide is to be used for the working of a flat or co-planar surface, the flat portion of the guide is placed in contact with the surface to be worked, thereby bringing the further support surface also into contact with the surface to be worked. However, when the cutter is being used to generate a non-planar surface, the tool is operated with the flat portion of the peripheral wall out of contact with the workpiece, and with the rotary cutter projecting through the slot in the curved portion of the guide member, thereby providing the freedom for operating the rotary cutter to produce a non-planar surface.

The invention will be more readily understood from the following description of one practical arrangement of the guide supplied to a cutting tool and as illustrated in the accompanying drawings.

Figure 1:
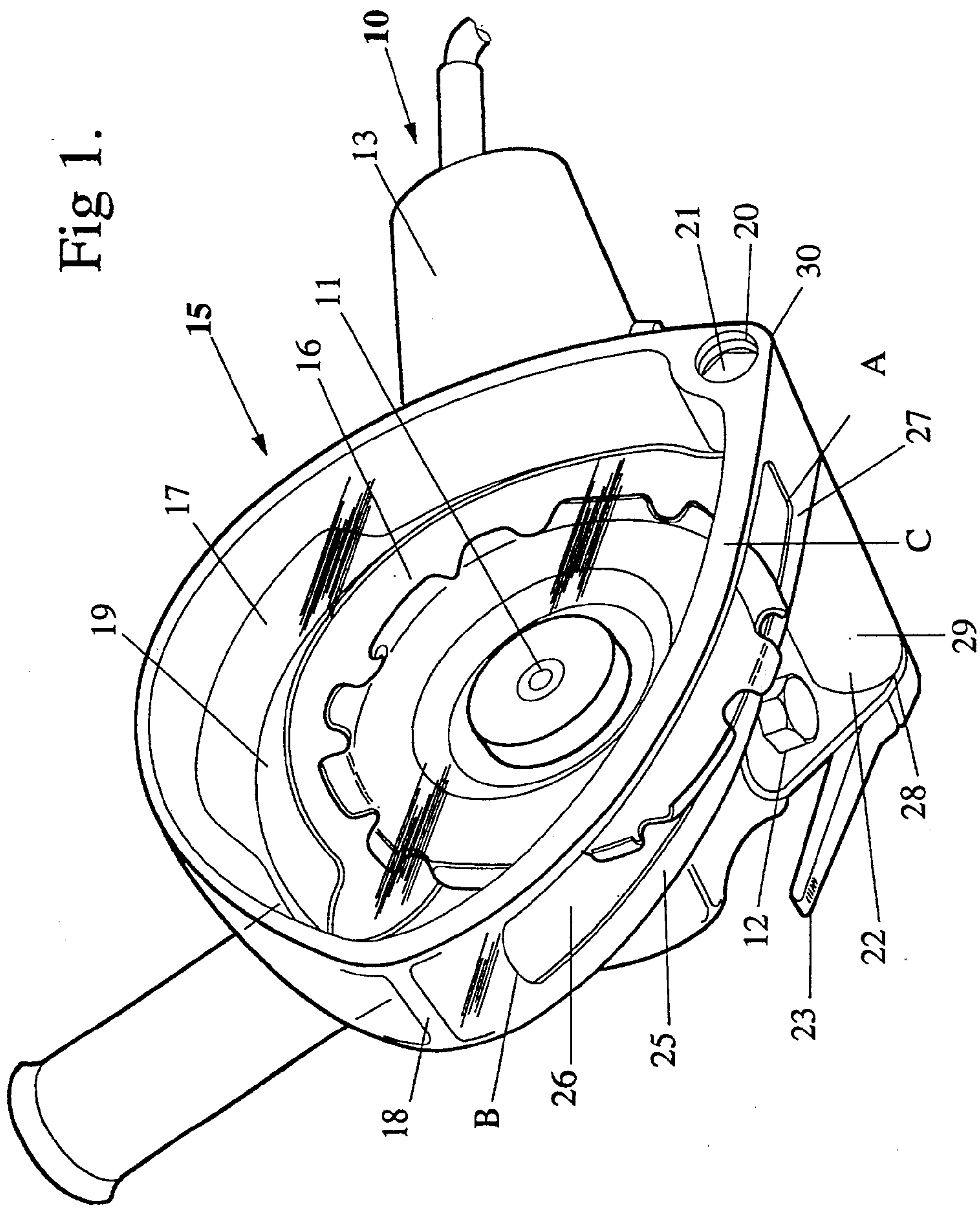
FIG. 1 is a perspective view of the guide fitted to a hand held angle grinder.

Referring now to the drawings, wherein the guide 15 is mounted on the housing 13 of the conventional angle grinder 10 with a rotary cutting tool 16 mounted on the drive spindle 11 of the angle grinder. The construction of a conventional angle grinder 10, and the manner of mounting a rotary cutting tool on the spindle 11 thereof, are well known and shall not be further described in this specification.

The guide 15 has a side wall 17 with a peripheral wall 18 extending laterally therefrom about the complete periphery of the side wall 17. In the construction shown, the angle grinder has a conventional guard member 19 fitted thereto and the guide 15 is dimensioned so the peripheral wall 18 is fitted about the guard member 19 so the latter is located substantially housed within the area bounded by the peripheral wall 18 of the guide 15. The side wall 17 and peripheral wall 18 are of a one piece construction, conveniently moulded from a rigid plastic material. As illustrated in FIG. 1, the plastic material is transparent.

The guide 15 is mounted on a spindle 21 that is supported in the bracket 22 secured to the housing 13 of the angle grinder by the bolt 12. In an alternative construction, the spindle 21 can be suitably supported on lugs or like provisions incorporated in the angle grinder housing 13, as a substitute for the bracket 22 and the bolt 12.

The spindle 21 is non-rotatably attached to the guide 15, such as by a hexagonal head thereon (not shown) being received in a complementary hexagonal shaped recess 20 in the guide side wall 17. The opposite end of the spindle is threadably engaged in the lever 23, whereby manual actuation of the lever 23 can lock or release the guide 15 for pivotal movement relative to the bracket 22 and hence to the housing 13, to thereby adjust the degree of projection of the cutting tool between respective minimum and maximum cut positions relative to the guide 15.

Also, the lever 23 can be actuated to lock the spindle 21 in a plurality of positions, corresponding to intermediate positions of the guide 15 between the two extreme positions. This can be achieved by actuating the lever 23, threadably engaging the spindle 21, to establish appropriate frictional forces between the respective components so that the guide member will lock in any selected angular position relative to the rotary cutting tool 16. Alternatively, appropriate inter-fitting configurations can be provided on the lever and the bracket 22 to achieve more positive location of the guide 15 in a selected position. A spring may be provided operably arranged between the guide 15 and bracket 22 to urge the guide in a direction to enclose the cutting tool 16 within the guide when the lever 23 is operated to release the spindle 21.

The lower section 25 of the peripheral wall 18 of the guide 15 has a central slot 26 extending between the locations A and B in FIG. 1. The slot 26 is of a width sufficient to allow the rotary cutter 16 to project therethrough with suitable running clearance between the opposite edges of the slot 26. As can be seen in FIG. 1, the lower section 25 of the peripheral wall 18 has a straight or flat surface portion 27, which extends from the location of the support spindle 21 to a location C, a short distance forward of the axis of the rotary cutter 16. This flat surface portion 27 of the guide 15, that extends partly on either side of the slot 26, provides a planar support for contact with a surface to be worked on by the rotary cutter 16.

In addition, the lower portion 28 of the lever 23 and lower portion 29 of the bracket 22 are each of a semicircular form, coaxial with the spindle 21, and of a radius equal to the distance from the axis of the spindle 21 to the plane of the lower face of the flat portion 27 of the peripheral wall 18. The arcuate portion 30 of the peripheral wall is also coaxial with the spindle 21, and of the same radius as the portions 28 of the lever 23 and lower portion 29 of the bracket 22, whereby the lower face of the flat portion 27 is tangential to arcuate portion 30. This interrelationship between the portion 28 of the lever 23, the portion 29 of the bracket 22, and the arcuate portion 30 of the peripheral wall 18, provide laterally extending surfaces to engage the workpiece and provide lateral stability to the complete tool, whilst the lower surface of the flat portion 27 of the peripheral wall 18 is in engagement with the workpiece. Thus, the operator is able to use the rotary cutting tool to machine substantially flat surfaces with a high degree of accuracy, safety and ease.

Figure 2:
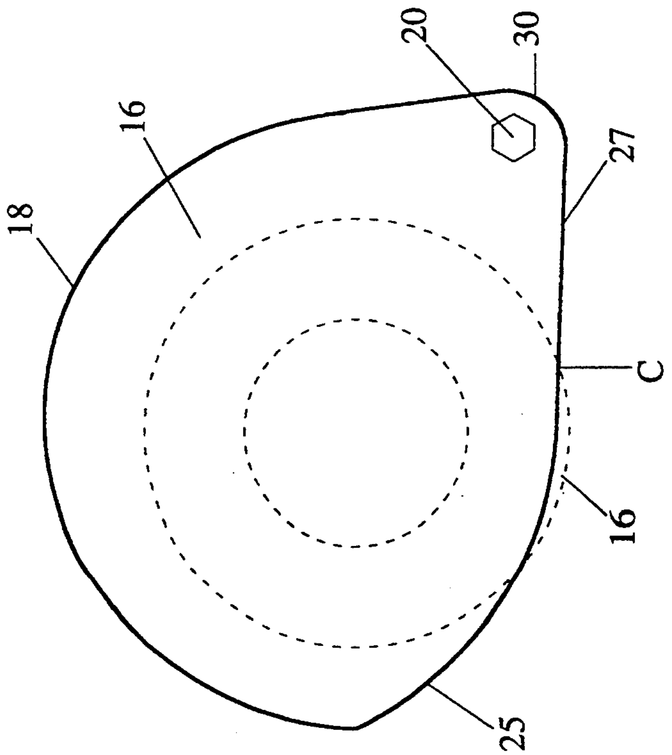
FIG. 2 is a diagrammatic side view of the guide set for working on a flat surface.

The smoothly curved portion 32 of the lower section 25 of the peripheral wall 18 between B and C progressively increases in radius with respect to the axis of the cutter 16, so as the guide 15 is further pivoted upwardly from the position shown in FIG. 2, the cutter will project through the slot 26 to an increased extent. The extent of projection of the cutter will increase as the angle of movement of the guide increases. The cutter 16 is shown in substantially the maximum degree of extent in FIG. 3.

Figure 3:
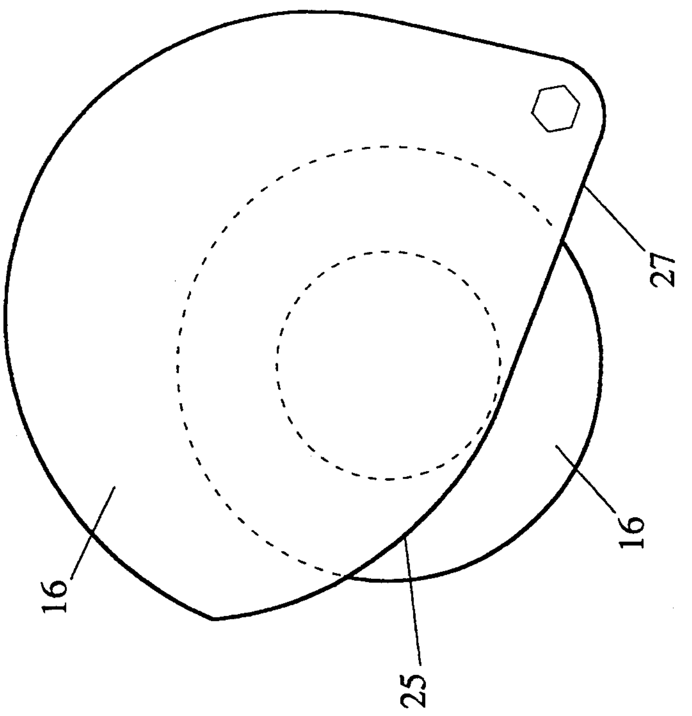
FIG. 3 is a diagrammatic side view similar to FIG. 2 with the guide set for working on a non-flat surface.

The guide 15 when in a position as shown in FIG. 3, functions primarily as a guard against accidental contact by the user with the upper portion of the cutter; rather than a guide for the cutter. With the guide so positioned, the handle 13 of the angle grinder is more upwardly directed and the cutter is moved in a lateral sweeping action to perform contouring of the surface being worked. Also with the guide set in this position relatively deep plunge cuts and grooving can be performed.

It is to be understood that the upper portion of the guide can be of differing shape and configuration to suit different hand tools and cutters and the important features of the guide are the form of the lower section 25 of the peripheral wall 18 and the laterally extending support surfaces 28 and 29 of the lever 23 and bracket 22 respectively. These features contribute substantially to the improved control of the cutter with resultant increased accuracy and safety.

I claim:

1. A guide for a hand held power tool having a housing and a spindle rotatably supported in said housing and projecting therefrom to have mounted thereon a rotary cutter having a peripheral cutting formation, said guide comprising a rigid member having a peripheral wall to in use be disposed about at least portion of the periphery of the rotary cutter, means to mount said guide member on the power tool housing for annular movement about an axis offset from and parallel to the rotary cutter axis and so that said peripheral wall is located about at least part of the periphery of the rotary cutter, a slot in said peripheral wall through which portion of said rotary cutter can project to engage a workpiece, said peripheral wall on opposite sides of said slot being flat over portion of the length of said slot, and means to selectively lock the guide member relative to the axis of the rotary cutter to set the degree of projection of the rotary cutter through the slot between said flat portions of the peripheral wall.

2. A guide as claimed in claim I wherein said means to mount the guide member includes a further guide surface extending laterally from and co-planar with said flat portions of said peripheral wall.

3. A guide as claimed in claim 2 wherein said further guide surface is integral with the tool housing.

4. A guide as claimed in claim 2 or 3 wherein the further surface is of arcuate shape coaxial with said axis parallel to the axis of rotation of the cutter.

5. A guide as claimed in claim, 4 wherein the means to mount the guide member to the power tool housing is located at the end of said flat portion remote from the junction of the tangential and arcuate shaped portions.

6. A guide as claimed in claim 5 where the length of said flat portion of the peripheral wall is about equal to the distance between the axis of the guide member and the axis of rotation of the cutter.

7. A guide as claimed in claim 6 wherein the arcuate shaped portion of the peripheral wall progressively increases in radius with respect to the axis of the cutter from the junction with said flat portion.

8. A guide as claimed in claim I wherein said peripheral wall is arcuately shaped over a portion of the peripheral length thereof and said fiat portions of the peripheral wall are substantially tangential to said arcuate portion, said slot extending along said fiat portion and at least part of the length of said arcuately shaped portion.

9. A guide for a hand-held tool having a housing to support a rotary cutter with a peripheral cutting formation and a drive mechanism to rotate the cutter, said guide comprising a rigid guide member having a peripheral wall to in use be disposed about at least portion of the periphery of the rotary cutter, means to mount said rigid member on the housing with said peripheral wall in place about at least part of the periphery of the rotary cutter, said peripheral wall having a slot therein through which portion of the rotary cutter projects to engage a workpiece, means operable to adjust the position of said rigid guide member relative to the housing to vary the degree of projection of the cutter through the slot, and a further support means on or mountably attached to the housing to support the housing at a location spaced from the rigid guide member in the direction of the pivot axis thereof.

10. A guide as claimed in claim 9 wherein the guide member and the further support means have respective arcuate surfaces coaxial with the pivot axis of the guide member so that at any position of the guide member with respect to the rotary cutter, the respective arcuate portions to be placed in contact with the surface of the material being worked to provide stable support for the housing.

11. A guide for a hand held power tool having a housing and a spindle rotatably supported in said housing and projecting therefrom to have mounted thereon a rotary cutter having a peripheral cutting formation, said guide comprising a rigid member having a peripheral wall to in use be disposed about at least portion of the periphery of the rotary cutter, means to mount said guide member on the power tool housing for annular movement about an axis offset from and parallel to the rotary cutter axis and so that said peripheral wall is located about at least part of the periphery of the rotary cutter, a slot in said peripheral wall through which portion of said rotary cutter can project to engage a workpiece, said mounting means being adapted to permit movement of said guide member relative to the rotary cutter to adjust the extent of projection of the cutter through said slot, said peripheral wall on opposite sides of said slot being flat over portion of the length of said slot.

12. A guide as claimed in claim 11 wherein a further guide surface is provided laterally spaced from and coplanar with said flat surface portion of said peripheral wall.

13. A guide as claimed in claim 11 or 12 wherein said mounting means is adapted to allow pivotal movement of the rigid member relative to the rotary cutter about an axis parallel to the axis of rotation of the cutter to thereby adjust the extent of projection of the cutter through said slot.

14. A guide as claimed in claim 12 wherein the further guide surface is of arcuate shape coaxial with said axis parallel to the axis of rotation of the cutter.

* * * * *